United States Patent [19]
Hayashi

[11] Patent Number: 5,528,484
[45] Date of Patent: Jun. 18, 1996

[54] POWER SUPPLY

[75] Inventor: Koichi Hayashi, Vaucluse, Australia

[73] Assignee: H.P.M. Industries Pty Limited, Australia

[21] Appl. No.: 302,822

[22] PCT Filed: Jun. 28, 1993

[86] PCT No.: PCT/AU93/00315

§ 371 Date: Sep. 13, 1994

§ 102(e) Date: Sep. 13, 1994

[87] PCT Pub. No.: WO94/16492

PCT Pub. Date: Jul. 21, 1994

[30] Foreign Application Priority Data

Jan. 14, 1993 [AU] Australia ................... PL6811

[51] Int. Cl.$^6$ ...................................... H02M 1/12
[52] U.S. Cl. ............................... 363/47; 363/89
[58] Field of Search ................. 363/47, 48, 19, 363/89; 315/247

[56] References Cited

U.S. PATENT DOCUMENTS

| | | | |
|---|---|---|---|
| 4,564,897 | 1/1986 | Okamoto et al. | 363/47 |
| 4,745,539 | 5/1988 | Nilssen | 363/37 |
| 4,945,467 | 7/1990 | Bhagwat | 363/132 |
| 5,082,998 | 1/1992 | Yoshioka | 363/37 |

FOREIGN PATENT DOCUMENTS

| | | |
|---|---|---|
| 42851/72 | 12/1973 | Australia . |
| 58-046868 | 3/1983 | Japan . |
| 2022943A | 12/1979 | United Kingdom . |
| 2133940A | 8/1984 | United Kingdom . |

Primary Examiner—Peter S. Wong
Assistant Examiner—Y. Jessica Han
Attorney, Agent, or Firm—Kelly, Bauersfeld & Lowry

[57] ABSTRACT

A power supply which incorporates a high frequency inverter and which is suitable for use in conjunction with a florescent lamp. The power supply comprises a full wave rectifier (10) and a reservoir capacitor (12) connected across the rectifier for the purpose of providing successive half-cycles of the voltage waveform V2 across the capacitor with a minimum instantaneous voltage level greater than zero. A solid state switching device (14) and an oscillator (15) are connected in circuit with the reservoir capacitor. The oscillator generates a gating signal to the switching device. The switching device is arranged to provide an output voltage V4 which has a frequency determined by the applied gating signal V3 and which has a peak amplitude value which varies over successive cycles with the waveform of the voltage V2 across the reservoir capacitor.

9 Claims, 5 Drawing Sheets

POWER SUPPLY

TECHNICAL FIELD

This invention relates to a power supply for an electrical circuit and, in particular, to a power supply which incorporates a high frequency invertor which is suitable for use in conjunction with a fluorescent lamp. The power supply has been developed primarily as a so-called electronic ballast for a compact fluorescent lamp and is hereinafter described in such context. However, the invention does in fact have broader application.

BACKGROUND ART

A compact fluorescent lamp is normally connected to a mains voltage lighting circuit by way of an integral lamp base which incorporates a power supply in the form of a switch mode converter-inverter. The supply voltage is full-wave rectified and the resultant direct current is fed to an inverter which produces alternating current at a frequency in the order of 40 to 50 kHz.

The converter stage of the conventional power supply includes a bridge rectifier and a reservoir capacitor connected across the dc side of the rectifier. The capacitance value of the reservoir capacitor is chosen to minimise the ripple voltage at the dc side of the rectifier and, as a consequence, current is drawn from the mains supply in the form of a relatively narrow pulse during each half-cycle of the supply voltage. As a result, the supply current contains a large number of harmonics which have the effect of reducing the power factor, producing rf radiation and otherwise creating power generation and distribution problems for supply authorities in areas where large numbers of compact fluorescent lamps are used.

Various proposals have been made for solving the above mentioned problems, including those disclosed and referenced in European patent specification number 0296859 (application no. 88305743.2, dated Jun. 23, 1988) entitled "Power factor correction circuit". However, all known proposals for improving the shape of the mains current waveform and, hence, reducing the harmonic content, have involved circuits adapted to effect prolonged current flow through the bridge rectifier during each half-cycle of the supply voltage whilst maintaining the high value of the reservoir capacitor for the purpose of minimising the ripple voltage at the dc side of the rectifier.

DISCLOSURE OF THE INVENTION

The present invention is based on an entirely different approach from that described above; one in which a high ripple voltage at the dc side of a rectifier is tolerated. This results in prolonged flow of current during each half-cycle of the supply voltage.

Thus, the present invention may be defined broadly as providing a power supply which comprises a full wave or bridge rectifier, means providing for successive half-cycles of the voltage across the dc side of the rectifier to have a minimum instantaneous value greater than zero, a solid state switching device connected in circuit with the rectifier and an oscillator located in circuit with the switching device. The oscillator is arranged to generate a gating signal at a frequency significantly greater than that of the voltage across the rectifier and to apply the gating signal to the switching device. The switching device is arranged to provide an output voltage which has a frequency determined by the applied gating signal and which has a peak amplitude value which varies over successive cycles with the waveform of the voltage across the rectifier.

A capacitor is preferably incorporated in the power supply to provide a minimum instantaneous voltage level greater than zero. Thus, the invention in its preferred form may be defined as a power supply comprising a bridge rectifier, a reservoir capacitor connected across the rectifier, a solid state switching device connected in circuit with the reservoir capacitor and an oscillator located in circuit with the switching device. The oscillator is arranged to generate a gating signal at a frequency significantly greater than that of the voltage across of the reservoir capacitor and to apply the gating signal to the switching device. The switching device is arranged to provide an output voltage which has a frequency determined by the applied gating signal and which has a peak amplitude value which varies over successive cycles with the waveform of the voltage across the reservoir capacitor.

As a consequence of accepting that the peak amplitude value of the output voltage may vary over successive cycles, the voltage at the dc side of the rectifier does not need to be smoothed and the reservoir capacitor may be employed effectively for the sole purpose of imparting a (positive or negative) value greater than zero to the instantaneous minimum level of the voltage across the rectifier. The magnitude of the minimum voltage and, hence, the value of capacitance required in the reservoir capacitor will depend upon the required application of the power supply. When used in conjunction with a fluorescent lamp, it has been determined that the reservoir capacitor should be selected to provide a voltage which has an instantaneous minimum level of not less than 30 volts in order to avoid significant discernible flickering of the tube illumination.

The voltage supply for the oscillator is preferably derived as a proportion of the voltage across the reservoir capacitor, and the capacitance value of the reservoir capacitor will then need be sufficient to provide a voltage which has an instantaneous minimum level sufficient to sustain operation of the oscillator.

When the power supply is used for energising a compact fluorescent tube, the reservoir capacitor might typically have a value in the order of 10% of the value of a capacitor which would otherwise be chosen to minimise the ripple voltage across the reservoir capacitor. However, the value of the reservoir capacitor should be selected to be as small as possible whilst, at the same time, providing for an instantaneous minimum level of ripple voltage which is sufficiently high for the dual purposes of maintaining supply to the oscillator and sustaining excitation of the fluorescent tube.

The switching device preferably comprises a field effect transistor and the oscillator, which has an output connected to the gate of the transistor, preferably comprises an integrated circuit oscillator. The period of oscillation will be selected to meet specific requirements of the power supply circuit and, when used for energising a compact fluorescent tube, the oscillator might be selected typically to provide an oscillation frequency in the order of 20 to 50 kHz, with a 2 to 5 µS ON time in a total period of 20 to 50 µS. However, the oscillator is preferably controlled to provide an ON time which increases with decreasing amplitude of the ripple voltage across the reservoir capacitor. That is, the oscillator may be controlled to provide an ON time of 2 µS in a total period of 25 µS (assuming an oscillator frequency of 40 kHz) when the amplitude of the ripple voltage is a maximum and to progressively increase the ON time to 10 μS when the amplitude of the ripple voltage is a minimum.

The invention will be more fully understood from the following description of a preferred embodiment of a power supply for a compact fluorescent tube, the description being provided with reference to the accompanying drawings.

MODE FOR CARRYING OUT THE INVENTION

Figure 1:
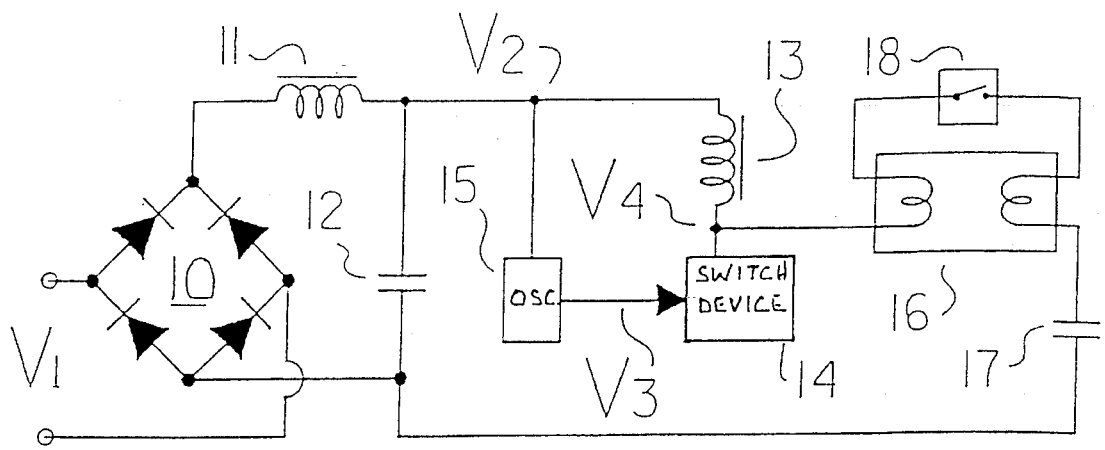
FIG. 1 shows a schematic representation of a circuit applicable to the power supply.

As illustrated in FIG. 1, the power supply comprises a full-wave bridge rectifier 10, a low frequency current limiting inductor 11, a reservoir capacitor 12, a high frequency inductor 13, a solid state switching device 14 and an oscillator 15 which is employed to provide gating signals to the switching device 14. The voltage that appears across the switching device 14 is applied to a fluorescent tube 16, and a high pass capacitor 17 is located in series with the tube 16. Also, a starter 18 in the form of a bimetal switch is connected between the filaments of the tube 16 in the usual way.

Although the voltage supply for the oscillator 15 is derived as a proportion of the voltage $V_2$ across the reservoir capacitor, the gating signal from the oscillator 15 is effectively independent of voltage across the reservoir capacitor 12. The energising voltage $V_4$ which is applied to the tube 16 is obtained as a function of the voltage across the reservoir capacitor 12 and the frequency of the gaming signal from the oscillator 15.

Figure 3:
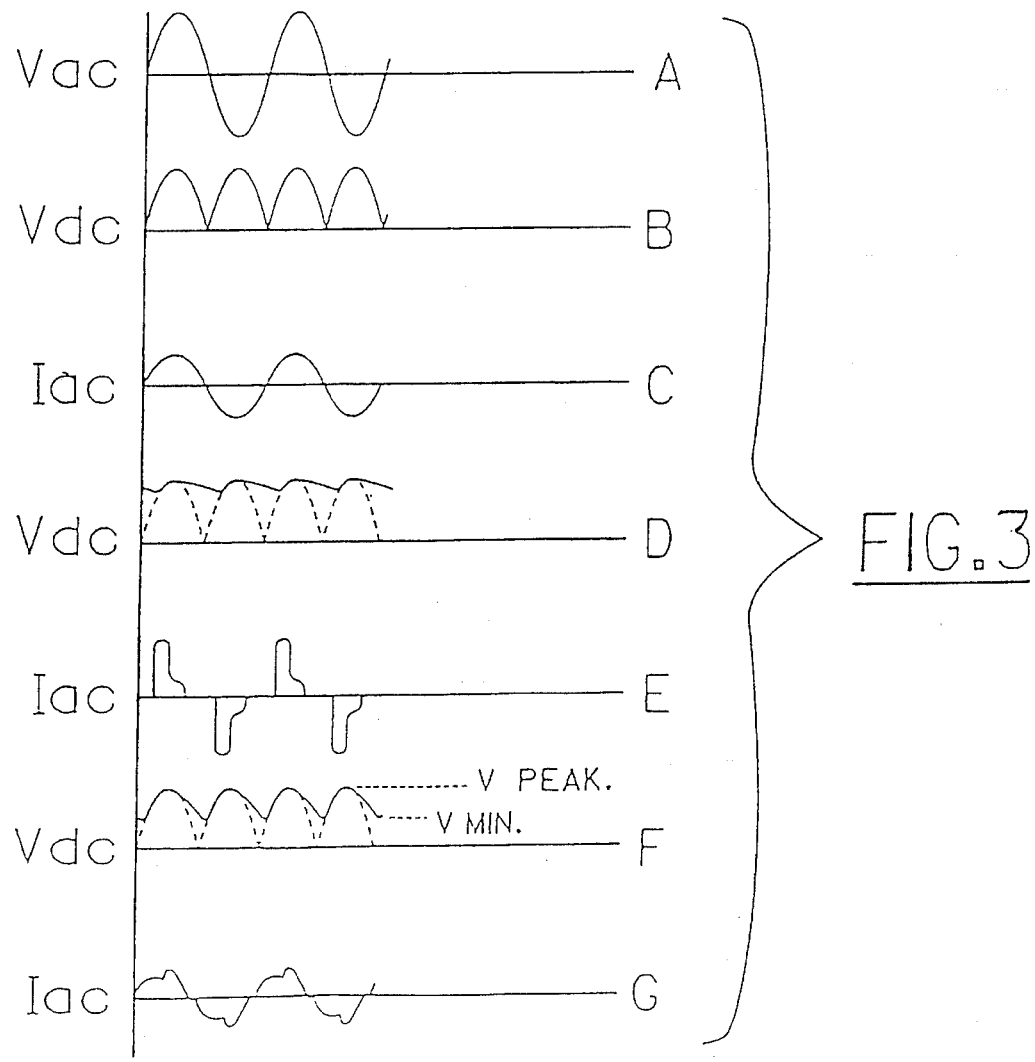
FIG. 3 shows a series of waveforms applicable
A—the voltage waveform at the ac side of a bridge rectifier
B—the voltage waveform at the dc side of a bridge rectifier to which a purely resistive lead is connected
C—the current waveform into a bridge rectifier to which a resistive lead is connected
D—the (ripple) voltage waveform at the dc side of a bridge rectifier across which a "high" value reservoir capacitor is connected
E—the current waveform into a bridge rectifier to which a high value reservoir capacitor is connected
F—the (ripple) voltage waveform at the dc side of a bridge rectifier across which a "low" value reservoir capacitor is connected
G—the current waveform into a bridge rectifier to which a low value reservoir capacitor is connected.
Figure 4:
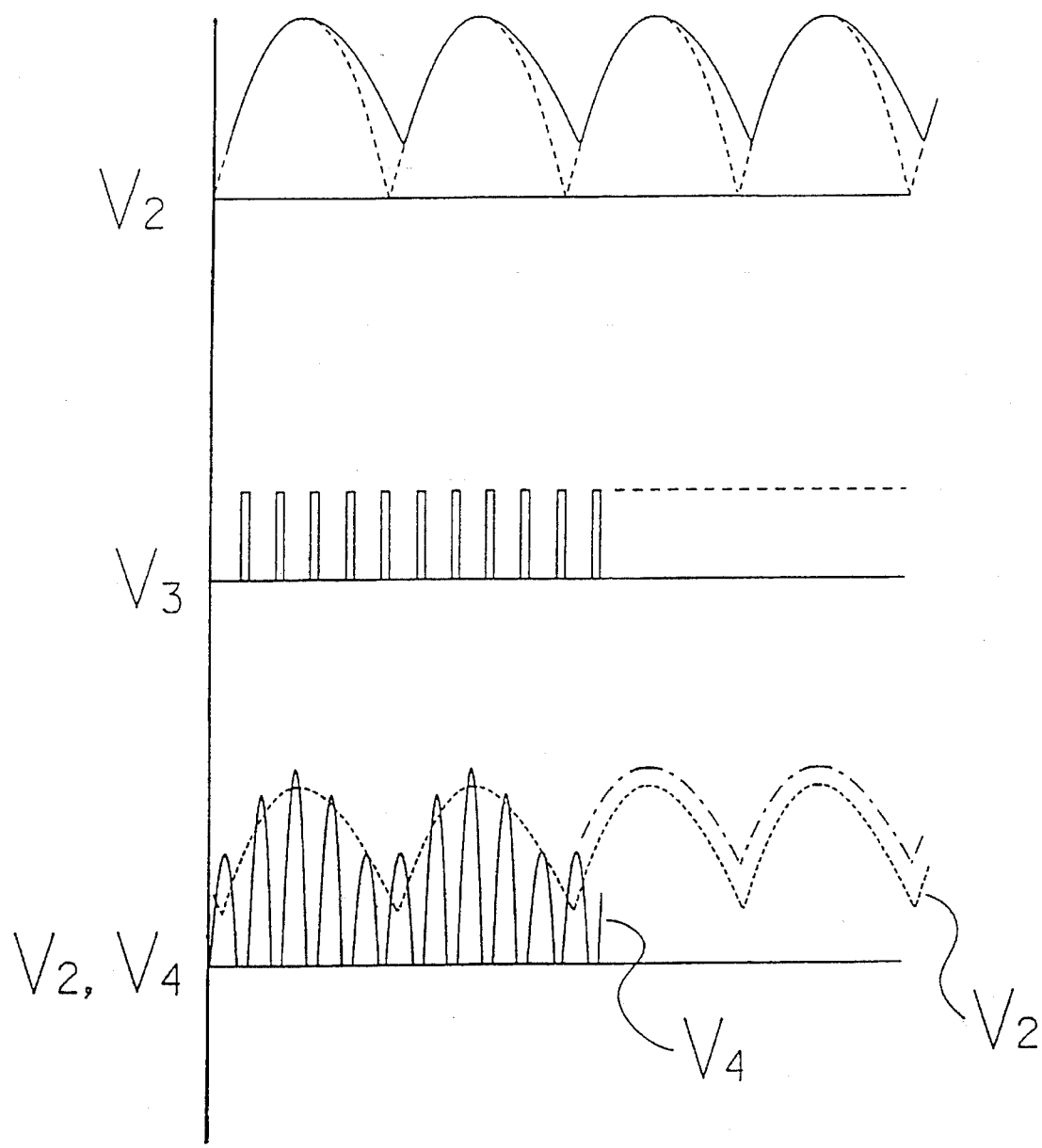
FIG. 4 shows voltage waveforms as measured at the points indicated by legends $V_2$, $V_3$ and $V_4$ in FIGS. 1 and 2.

The capacitance value of the reservoir capacitor 12 is chosen to provide a high ripple voltage, that is to effect a relatively low level of smoothing, and at the same time to provide an instantaneous minimum level of ripple voltage which is sufficiently high to sustain operation of the oscillator 15 and maintain excitation of the tube 16. This latter aspect is described in more detail in the context of the circuit of FIG. 2 and the waveforms shown in FIG. 4 of the drawings. However, before proceeding with that description, brief reference is first made to the waveforms that are shown in FIG. 3.

Waveform A represents the supply voltage $V_1$ which is applied to the ac side of the bridge rectifier 10. Waveform B represents the voltage that would appear at the dc side of the rectifier if the current from the rectifier were to flow into a purely resistive load, and waveform C represents the current that would flow into the ac side of the rectifier with such a resistive load connected in circuit with the rectifier.

Waveform D represents the ripple voltage that would normally appear at the dc side of the rectifier of a prior art power supply circuit of a type that incorporates a reservoir capacitor having a typically "high" value of capacitance, and waveform E represents the current pulses that flow into the ac side of a rectifier of a power supply which produces a ripple voltage of the type shown in waveform D.

Waveform F represents the ripple voltage that appears at the dc side of the rectifier 10 of the power supply of the present invention, that is a power supply having a reservoir capacitor 12 with a relatively "low" value of capacitance, and waveform G represents typically the current that flows into the ac side of the rectifier 10 as a consequence of the inclusion of a low value capacitance 12.

Figure 2:
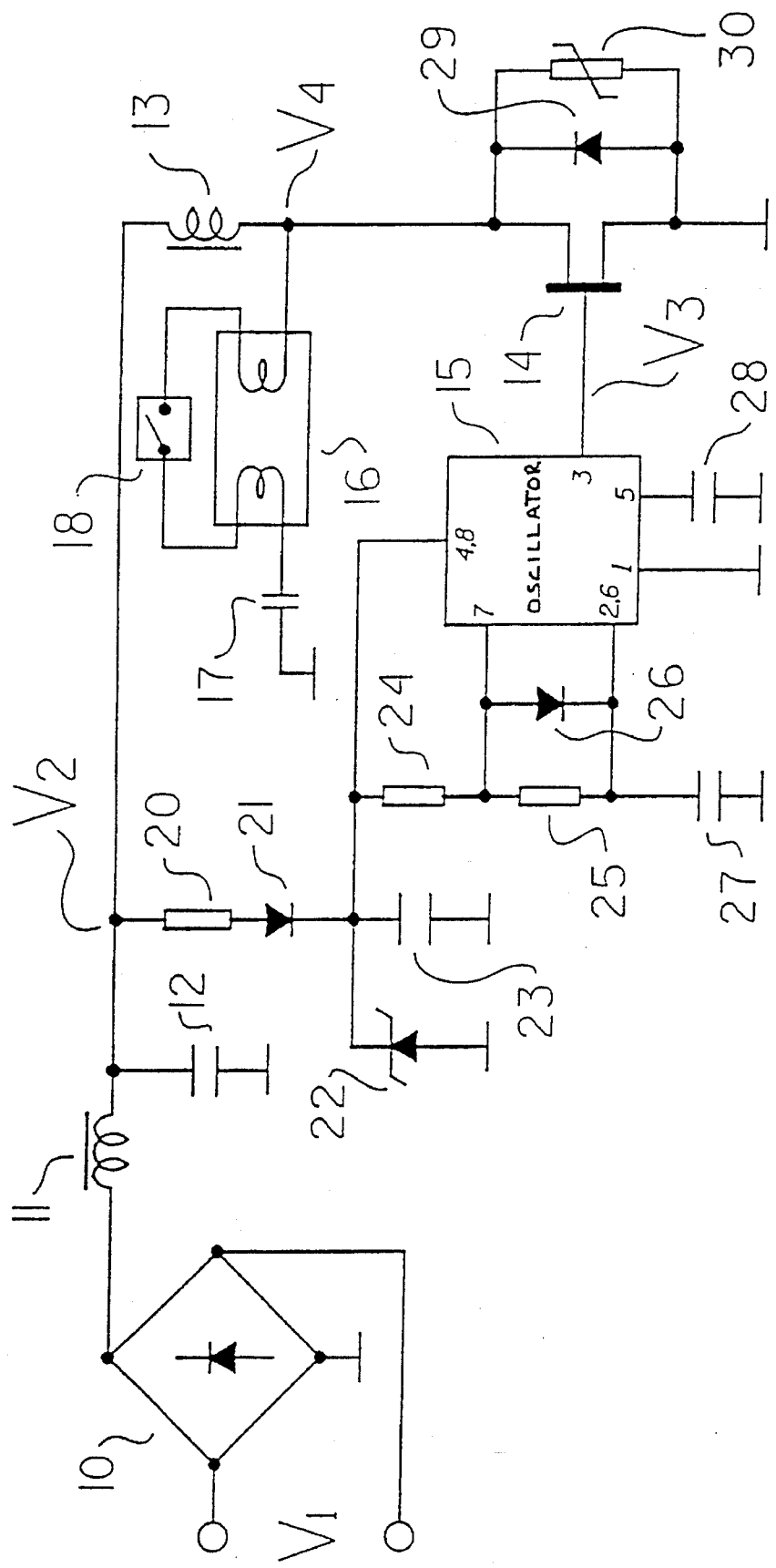
FIG. 2 shows an actual circuit diagram applicable to the power supply.

The power supply circuit which is shown schematically in FIG. 1 is illustrated in more detail in FIG. 2 and corresponding circuit elements are indicated by the same numerals in both figures. Further circuit components shown in FIG. 2 include a voltage dropping resistor 20 and a constant voltage power supply which comprises a diode 21, Zener diode 22 and low pass capacitor 23.

The oscillator 15 shown in FIG. 2 comprises a 555 integrated circuit to which the constant voltage supply is connected via pins 4,8. Voltage divider resisters 24 and 25, diode 26 and capacitors 27 and 28 are provided to control the operation of the oscillator, including the period of oscillation and the mark-space ratio. With a 40 kHz output signal from the oscillator the circuit components may be chosen to provide an oscillator ON period of up to 5 μS in a total period of 25 μS.

The output signal $V_3$ from pin 3 of the oscillator 15 is applied to a switching device 14 in the form of a field effect transistor (FET). The FET 14 is connected in circuit with the tube 16 in such manner that, when the FET is gated into conduction the instantaneous drain voltage $V_4$ applied to the tube 16 is zero and when the FET is gated OFF the instantaneous drain voltage applied to the tube rises to that which exists instantaneously at the drain side of the inductor 13.

With a 240 volt RMS supply $V_1$ at the ac side of the rectifier 10 and a resultant peak voltage level typically of 325 volts at the dc side of the rectifier, the value of the reservoir capacitor 12 may be selected to provide a minimum ripple voltage level in the order of 40 volts. The peak and minimum ripple voltage levels are indicated as such in FIG. 3F and these voltage levels increase to approximately 450 volts and 55 volts respectively at the FET drain when the FET is gated OFF, due to the influence of the inductor 13. Thus, the voltage applied to the tube 16 has a peak amplitude which varies over successive cycles with the voltage waveform across the reservoir capacitor 12. This is indicated schematically in FIG. 4 and in which, for ease of illustration, the period of each cycle of the gate voltage $V_3$ and the tube voltage $V_4$ is expanded relative to the period of the voltage $V_2$ across the reservoir capacitor.

A reverse biased diode 29 and a metal oxide varistor (MOV) 30 are connected across the drain and source of the FET in order to protect the FET from any transient spikes that may appear in the power supply.

Circuit component types and values may be selected for specific applications but the following listing of circuit components is provided in respect of the power supply which is illustrated in FIG. 2 and which has been developed for use as a so-called electronic ballast for a 15 watt compact fluorescent lamp.

Low frequency inductor 11—4.7 mH
High frequency inductor 13—1.3 mH
Capacitor 12—0.33 μF
Capacitor 17—0.01 μF
Capacitor 23—220 μF
Capacitor 27—1,500 pF
Capacitor 28—0.01 μF
Resistor 20—20 kΩ
Resistor 24—1.2 kΩ
Resistor 25—105 kΩ
Zener diode 22—13 volts
Oscillator 15—555 IC
FET 14—IRF 840
MOV 30—Philips Type 2322-592-64612

Figure 5:
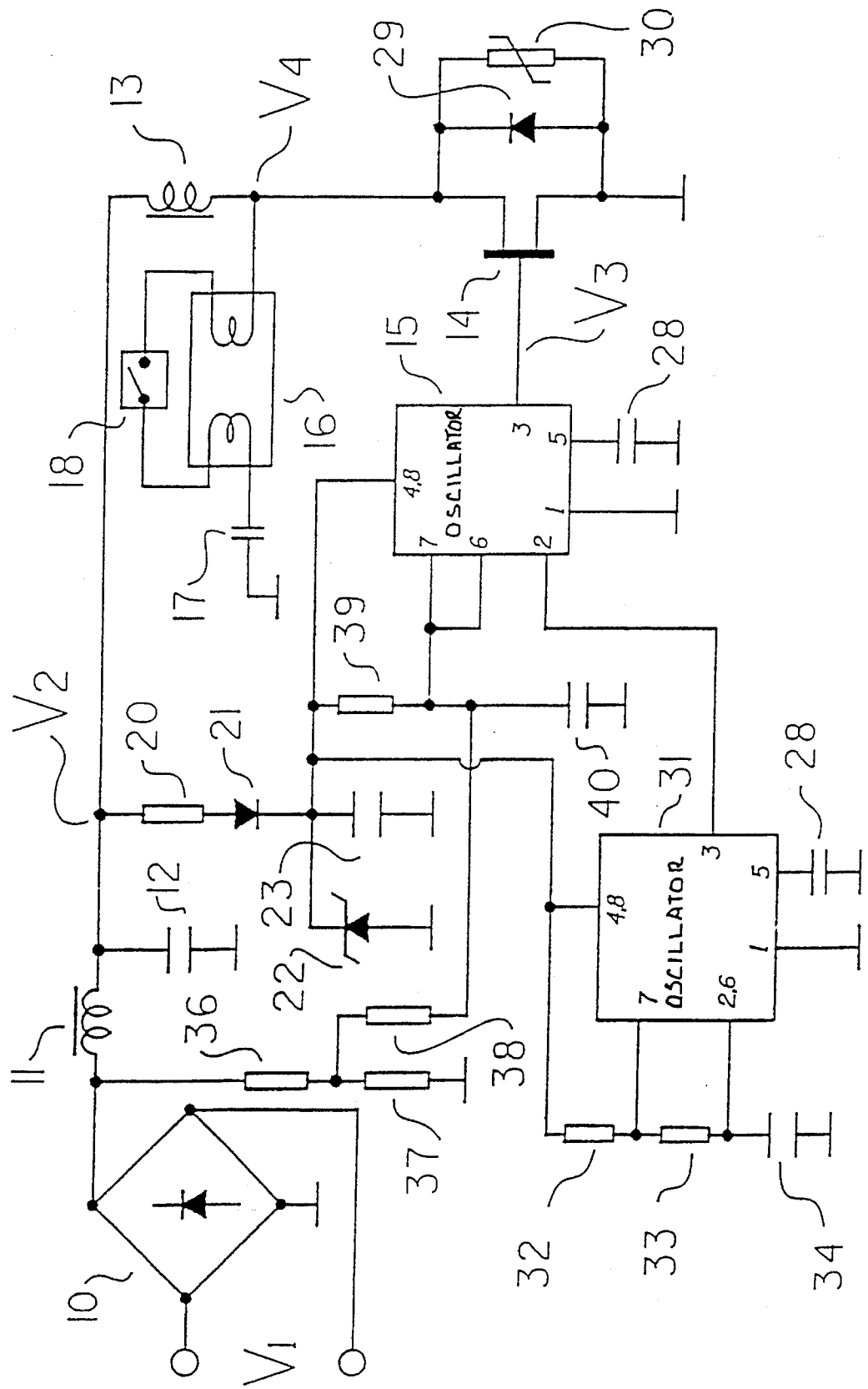
FIG. 5 shows a modified form of the circuit diagram which illustrated in FIG. 2.
Figure 6:
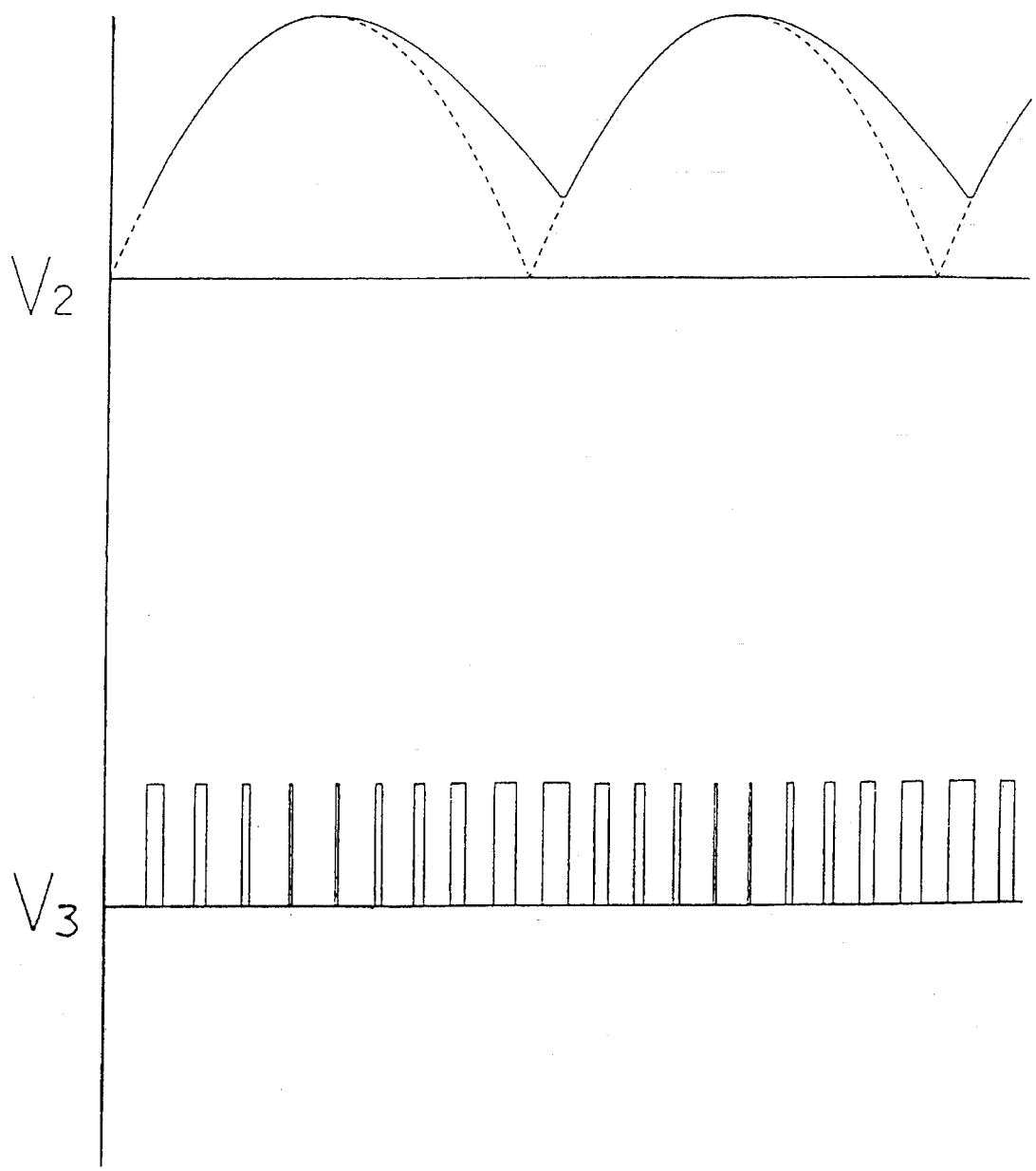
FIG. 6 shows voltage waveforms as measured at the points indicated by legends $V_2$ and $V_3$ in FIG. 5.

FIG. 5 of the drawings illustrates a power supply which also meets the operating principles of the schematic circuit shown in FIG. 1 and like reference numerals are employed in FIG. 5 to identify components that are the same as those illustrated in FIGS. 1 and 2. However, in the power supply of FIG. 5 the oscillator 15 is controlled to provide an ON time which increases with decreasing amplitude of the ripple voltage across the reservoir capacitor 12. This is illustrated diagrammatically in FIG. 6 which shows the output $V_3$ of the oscillator 15 plotted (on an expanded scale) with reference to the ripple voltage $V_2$.

In the circuit shown in FIG. 5 a further 555 oscillator 31 is controlled by circuit components 32 to 34 to generate trigger pulses at pin 3 at a 40 kHz rate. The trigger pulses from oscillator 31 are applied to pin 2 of the oscillator 15, and oscillator 15 is in this case controlled by the divider network comprising resistors 36 to 38 and the RC network comprising components 39 and 40 to provide an ON time that increases from 2 μS to 8 μS with decreasing amplitude of the ripple voltage across the bridge rectifier 10. Thus, with a high instantaneous value of ripple voltage the capacitor 40 will charge rapidly to provide a short ON time of the oscillator 15, and low instantaneous values of ripple voltage will result in relatively longer capacitance charging times and proportionately longer ON times of the oscillator 15.

Circuit component values that are applicable to the components in FIG. 5 (but not in FIG. 2) are listed as follows.

Oscillator 31—555 IC
Resistor 32—25 kΩ
Resistor 33—1.5 kΩ
Resistor 36—470 kΩ
Resistor 37—680 kΩ
Resistor 38—180 kΩ
Resistor 39—68 kΩ
Capacitor 34—1,000 pF
Capacitor 40—82 pF As in the case of the circuit shown in FIG. 2, that which is illustrated in FIG. 5 has been developed as an electronic ballast for use with a 15 watt compact fluorescent lamp. Variations and modifications may be made in the circuit as above described in order to accommodate other applications of the circuit.

I claim:

1. A power supply comprising a full wave ac-to-dc rectifier, a reservoir capacitor connected permanently in current conductive relationship across the dc side of the rectifier, an inverter stage comprising a solid state switching device and an oscillator connected in circuit with the reservoir capacitor, the oscillator being connected in circuit with the switching device, being arranged to generate a gating signal at a frequency significantly greater than that of the voltage waveform across the rectifier and being arranged to apply the gating signal to the switching device, the reservoir capacitor having a capacitance value which causes the successive half-cycles of the voltage waveform across the dc side of the rectifier to have a minimum instantaneous value which is greater than zero but small relative to the maximum instantaneous value of the voltage waveform, and the switching device being arranged to provide an output voltage which has a frequency determined by the applied gating signal and which has a peak amplitude value which varies over successive cycles with the waveform of the voltage across the reservoir capacitor.

2. The power supply as claimed in claim 1 wherein a voltage supply for the oscillator is derived as a proportion of the voltage across the reservoir capacitor and wherein the reservoir capacitor is selected to provide a voltage which has an instantaneous minimum level sufficient to sustain operation of the oscillator.

3. A power supply for a fluorescent lamp and which comprises a full wave ac-to-dc rectifier, a reservoir capacitor connected permanently in current conductive relationship across the rectifier, an inverter stage comprising a solid state switching device and an oscillator connected in circuit with the reservoir capacitor, the oscillator being connected in circuit with the switching device, being arranged to generate a gating signal at a frequency significantly greater than that of the voltage waveform across the reservoir capacitor and being arranged to apply the gating signal to the switching device, the reservoir capacitor having a capacitance value which causes successive half-cycles of the voltage waveform across the dc side of the rectifier to have a minimum instantaneous value which is small relative to the maximum instantaneous value of the voltage waveform but sufficiently large to sustain excitation of the florescent lamp, and the switching device being arranged to provide an output voltage which has a frequency determined by the applied gating signal and which has a peak amplitude value which varies over successive cycles with the waveform of the voltage across the reservoir capacitor.

4. The power supply as claimed in claim 3 wherein a voltage supply for the oscillator is derived as a proportion of the voltage across the reservoir capacitor and wherein the reservoir capacitor is selected to provide a voltage which has an instantaneous minimum level sufficient to sustain operation of the oscillator.

5. The power supply as claimed in claim 4 wherein the reservoir capacitor is selected to provide a voltage which has an instantaneous minimum level of not less than 30 volts when the power supply is connected to a mains voltage power supply.

6. The power supply as claimed in any one of claims 3 to 5 wherein the oscillator is controlled to provide the gating signal at a rate of 20 to 50 kHz and with an ON time of 2 to 10 µS during each oscillation period.

7. The power supply as claimed in claim 6 wherein the oscillator is controlled to provide an ON time which increases with decreasing amplitude of the voltage waveform across the reservoir capacitor.

8. The power supply as claimed in claim 3 wherein the switching device comprises a FET in series with a high frequency inductor.

9. The power supply as claimed in claim 3 wherein the reservoir capacitor has a capacitance value which causes successive half-cycles of the voltage waveform across the dc side of the rectifier to have a minimum instantaneous value which is not greater than 50% of the maximum instantaneous value of the voltage waveform.

* * * * *